United States Patent
Sambucetti et al.

(10) Patent No.: US 8,328,559 B2
(45) Date of Patent: Dec. 11, 2012

(54) DEVELOPMENT OF TRAINING AND EDUCATIONAL EXPERIENCES

(75) Inventors: Heber D. Sambucetti, St. Charles, IL (US); Don B. Vanthournout, St. Charles, IL (US); Kurt J. Olson, St. Charles, IL (US); Bradley D. Kolar, St. Charles, IL (US); John A. Ceisel, St. Charles, IL (US); Robert S. Gerard, St. Charles, IL (US)

(73) Assignee: Accenture Global Services Limited, Dublin (IE)

( * ) Notice: Subject to any disclaimer, the term of this patent is extended or adjusted under 35 U.S.C. 154(b) by 1021 days.

(21) Appl. No.: 11/024,960

(22) Filed: Dec. 30, 2004

(65) Prior Publication Data

US 2006/0147882 A1 Jul. 6, 2006

(51) Int. Cl.
*G09B 19/00* (2006.01)
*G09B 3/00* (2006.01)

(52) U.S. Cl. .......... 434/219; 434/350; 434/353

(58) Field of Classification Search .......... 434/219, 434/350, 356
See application file for complete search history.

(56) References Cited

U.S. PATENT DOCUMENTS

| | | | |
|---|---|---|---|
| 5,002,491 A * | 3/1991 | Abrahamson et al. | 434/322 |
| 5,788,504 A * | 8/1998 | Rice et al. | 434/219 |
| 6,155,840 A | 12/2000 | Sallette | |
| 6,732,183 B1 * | 5/2004 | Graham | 709/231 |
| 6,944,596 B1 * | 9/2005 | Gray et al. | 705/321 |
| 2001/0027455 A1 * | 10/2001 | Abulleil et al. | 707/102 |
| 2002/0087560 A1 * | 7/2002 | Bardwell | 707/100 |
| 2002/0142274 A1 * | 10/2002 | Fujino | 434/219 |
| 2002/0164565 A1 * | 11/2002 | Kanevsky et al. | 434/219 |
| 2004/0002039 A1 * | 1/2004 | Draper et al. | 434/118 |
| 2004/0133437 A1 * | 7/2004 | Draper et al. | 705/1 |
| 2004/0148216 A1 * | 7/2004 | Waddington | 705/10 |
| 2005/0026119 A1 * | 2/2005 | Ellis et al. | 434/219 |
| 2005/0065830 A1 * | 3/2005 | Duke et al. | 705/7 |
| 2005/0137924 A1 * | 6/2005 | Aiyah et al. | 705/8 |

OTHER PUBLICATIONS

B. Joseph Pine, II, et al., "The Experience Economy", Harvard Business School Press, 1999.

* cited by examiner

*Primary Examiner* — Xuan Thai
*Assistant Examiner* — Jerry-Daryl Fletcher
(74) *Attorney, Agent, or Firm* — Fish & Richardson P.C.

(57) ABSTRACT

A method for creating an educational product, or training experience, is herein described. The training experience includes a learning experience to impart knowledge on training experience participants, a networking experience to allow training experience participants to interact with a relevant peer group during training, a guest experience providing a defined level of interest and focus by participants during the training experience, and an enculturation experience to integrate training experience participants into the culture of the sponsoring organization. The training experience may be created through an assessment phase, a planning phase, a design phase, and an implementation stage, with subsequent product evaluation and revisions. Various milestones and checkpoints may be used to ensure that a level of phenomenality is achieved by the final training experience.

30 Claims, 5 Drawing Sheets

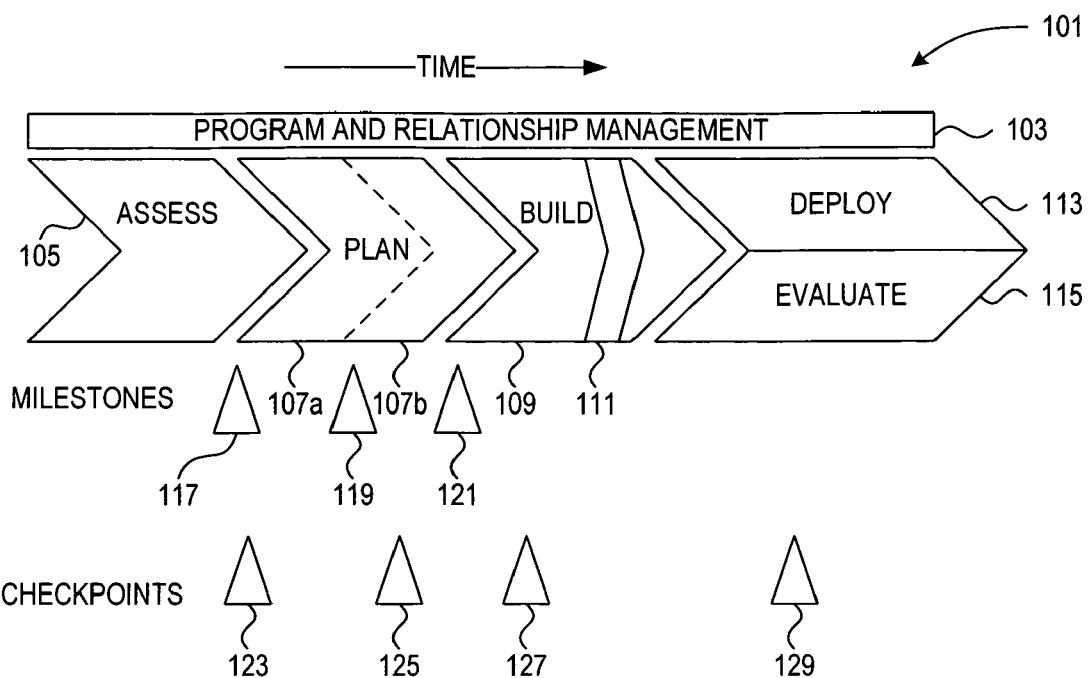

FIG. 1

| Plan – 1st Level of Detail | Plan – 2nd Level of Detail |
|---|---|
| • For each main performance outcome (goal):<br>  • How will we know and measure whether this is being met? What would look different?<br>  • What must be in place for the goal to be met (what would you have to see on a day to day basis that would convince you that you were heading in the right direction?)<br>  • What can the participant directly control to reach the goal? What does the participant need to decide?<br>  • What knowledge/skills are necessary to achieve the outcome?<br>• How should the content be grouped and ordered in the course?<br>• Given the outcomes and amount and depth of content, what should be the approximate length of the learning asset? Is this length feasible for the target audience? *If not, you need to scope out content accordingly.* | • For each module:<br>  • What should remain in the back of people's minds as they pursue this goal?<br>  • What processes and frameworks exist to support decision making in this area?<br>  • What are the key trade-offs they must manage?<br>  • What common obstacles exist that prevent us from reaching this goal?<br>  • What attitudes or beliefs do we need to change in order to help participants be more successful on the job? |

FIG. 2

| Plan – 1st Level of Detail | Plan – 2nd Level of Detail |
|---|---|
| • Based on knowledge sharing, skill building or the application of content, which instructional approach will enable you to achieve the desired learning goals (Instructor-led, Virtual-led, Web-based)?<br>• What are the learning objectives?<br>• What high-level instructional approach will allow us to achieve the course goals and learning objectives?<br>• If your instructional approach includes a case, what elements (e.g., environmental conditions, market focus, key business problem, etc.) need to be present in the case in order for participants to achieve the learning objectives? What is the case selection criteria/characteristics and potential candidates<br>• Given the audience, content, etc., how will we make this course phenomenal (learning, networking, enculturation, guest experience)? | • How does the course cover the learning objectives? What does the course "look/feel like?"<br>• What major activities are contained in the course?<br>• How will participants be supported in course activities (work) in the course?<br>• How does reflection occur in the course? How will the school make participants cognizant of and confident in what they are learning? How will participants recognize the usefulness and transferability of what they are learning?<br>• How do participants receive feedback on their work in the course?<br>• What are the major deliverables for the course (guides, support material, electronic materials, PST, etc.)?<br>• What media, if any, is needed to help deliver on course goals? |

*FIG. 3*

| Plan – 1st Level of Detail | Plan – 2nd Level of Detail |
|---|---|
| • What technology (if any) is required to deliver the course?<br>  • Will the course require an online guide or performance support tool (PST)?<br>  • Will the course require some other kind of application as part of the learning environment (e.g., application to learn coding or testing skills)?<br>  • Will we integrate the ADM Workbench?<br>• How will the technology support the content and/or participant? (i.e., what are the requirements for each technology element?)<br>• If the course is virtual:<br>  • What technology will we use to deliver this course?<br>  • Where will participants attend this course (physical dial-in location)?<br>  • Does the server have capacity to meet the defined schedule?<br>• Will the course materials need to be available to participants before or after the course?<br>• Will the PST or PST resources need to be available to participants after the course? | • For either an online guide/PST:<br>  • What technology will we use to deliver the online guide/PST?<br>  • How will participants perform the activities using the course technology?<br>  • What are the components of the interface that participants will see and use?<br>  • What are the primary components of the interface?<br>  • What style should be used in the interface (i.e., graphic characteristics, font style and size, etc.)?<br>• For other application:<br>  • What is the purpose of the application in the course?<br>  • What should it support or accomplish? What do we expect to accomplish with technology?<br>  • What functions are needed in the application? What does the on-line tool need to do?<br>  • What is the participant expected to do to navigate through the course?<br>  • Will multimedia (i.e. audio, video, Flash) be used?<br>  • Will the application interact with other applications?<br>  • Will the application be distributed?<br>  • Where will the application be hosted (i.e. server, local, etc.)?<br>  • What are the media included in the course (types of files, formats, etc.)? |

*FIG. 4*

| Plan – 1st Level of Detail | Plan – 2nd Level of Detail |
|---|---|
| • If classroom/virtual, what type & level of faculty are needed to deliver this asset? Availability of faculty to meet the demand? What considerations exist for the faculty of this course (e.g., experts/small # of set people, pool faculty, their general availability, how much time they can commit to prep, etc.)? What are the Faculty knowledge/skill requirements?<br>• If CBT/self-study, do people have to be connected to use it or can they download it for local use? (assumes myLearning as the delivery channel)<br>• Are there any other delivery constraints or requirements?<br>• If prework, what format will it take? | • What faculty and delivery support roles are required for delivery of the course?<br>• If classroom/virtual:<br>  • How many days of faculty preparation are required?<br>  • Who will conduct faculty preparation? What are the requirements for this person(s)?<br>  • What delivery support roles are required?<br>  • If required, what role with the learning coach play? What are the knowledge/skill requirements? |

*FIG. 5*

| Plan – 1st Level of Detail | Plan – 2nd Level of Detail |
|---|---|
| • How will the feasibility of the design be tested before proceeding with development?<br>• Who will review and sign off on the content and design?<br>• Is a lo-fi test necessary to verify the feasibility of the design before proceeding with development?<br>  • How will we structure the test?<br>  • What are the objectives of the test?<br>  • If a test was conducted, what were the outcomes of the test? | • Learning asset: How and when will we test the learning product?<br>  • What are the objectives of each pilot test?<br>  • What is the scope and the agenda for the test?<br>  • What procedures will we follow to mitigate any issues that arise during the test?<br>• If technology:<br>  • Have all appropriate testing phases been defined (e.g., component, assembly, product)?<br>  • Is a co-existence test needed?<br>  • Is the product distributed? This will impact the scope of the platform test.<br>  • What procedures will we follow to mitigate any SIRs that come out of testing? |

*FIG. 6*

| Plan – 1st Level of Detail | Plan – 2nd Level of Detail |
|---|---|
| • What are the risks and how will we mitigate them? | • What are the roles, milestones, and risks associated with the course build?<br><br>• *Work with ALSS/vendor to plan Development project, select Development Architecture & tools, etc.* |

*FIG. 7*

| Plan – 1st Level of Detail | Plan – 2nd Level of Detail |
|---|---|
|  | • How will we measure participant learning?<br>• What constitutes completion for this asset? |

*FIG. 8*

| Plan – 1st Level of Detail | Plan – 2nd Level of Detail |
|---|---|
| • What is the anticipated shelf life and update strategy for the course?<br>• When will it be decommissioned?<br>• How often will the course be updated and by whom?<br>• When will the first update occur once the pilot period has ended and the course is in rollout?<br>• What type of updates will be made? |  |

*FIG. 9*

| Plan – 1st Level of Detail | Plan – 2nd Level of Detail |
|---|---|
| | • What do we need to communicate about the course, and to whom?<br>• How will we advertise and market this course?<br>• How will we obtain participants for this course?<br>• Will people be auto enrolled/added to plan? |

DEVELOPMENT OF TRAINING AND EDUCATIONAL EXPERIENCES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to education and training. More specifically, the invention provides a systematic approach to create dynamic, engaging, and highly effective training courses and supporting materials for use in both commercial and non-commercial environments.

BACKGROUND OF THE INVENTION

Companies invest large sums of money both in hiring quality employees and training those employees to most effectively perform their jobs. For many companies, such as consulting companies where their product is their employees, developing and delivering training can be critical to the company's success. However, training is often viewed by employees as a rudimentary, or boring, task, and the employees then do not take the training seriously and do not benefit as much as they could from their training experiences. Thus, it would be an advancement in the art to develop a systematic procedure for creating a surprising and delighting level of excellence in the various aspects of a training experience, and to develop a training experience that provided benefits in addition to merely imparting knowledge or skills on its participants.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a method for creating a training experience for use by a sponsoring organization to train individuals associated with the sponsoring organization. The training experience includes a learning experience to impart knowledge on training experience participants, a networking experience to allow training experience participants to interact with a relevant peer group during training, a guest experience providing a defined level of interest and focus by participants during the training experience, and an enculturation experience to integrate training experience participants into the culture of the sponsoring organization.

According to an aspect of the invention, the training experience may be created by assessing training needs of the sponsoring organization, planning the training experience based on the training needs of the sponsoring organization, building the training experience based on the planning step, testing the training experience by implementing a pilot training experience program, revising the training experience based on the pilot training experience program, deploying the revised training experience, concurrently to deploying the training experience, evaluating the training experience and revising the deployed training experience based on the evaluation.

According to another aspect of the invention, the creation process may use various milestones, for example, a project definition at the end of the assessing step, a planning summary during the planning step, and a course requirements definition prior to the building step.

According to yet another aspect of the invention, the creation process may use various checkpoints, for example, shaping the training experience near the beginning of planning of the training experience, conducting a planning review near the end of the planning of the training experience, validating the training experience during the building step, and performing a delivery review of the deployed training experience.

The training experience may be classroom based or comprise a virtual classroom using computer based training. The virtual classroom may be used to present virtual seminars, workshops, and the like.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 1 illustrates a timeline for creating a training experience according to an illustrative embodiment of the invention.

FIG. 2 illustrates how content and scope requirements planning may be split between two subphases of a planning phase according to an illustrative embodiment of the invention.

FIG. 3 illustrates how architecture and design requirements planning may be split between two subphases of a planning phase according to an illustrative embodiment of the invention.

FIG. 4 illustrates how technology planning may be split between two subphases of a planning phase according to an illustrative embodiment of the invention.

FIG. 5 illustrates how delivery requirements planning may be split between two subphases of a planning phase according to an illustrative embodiment of the invention.

FIG. 6 illustrates how testing/review strategy planning may be split between two subphases of a planning phase according to an illustrative embodiment of the invention.

FIG. 7 illustrates how project and expectations management planning may be split between two subphases of a planning phase according to an illustrative embodiment of the invention.

FIG. 8 illustrates how measurement strategy planning may be performed during a single subphase of a planning phase according to an illustrative embodiment of the invention.

FIG. 9 illustrates how maintenance planning may be performed during a single subphase of a planning phase according to an illustrative embodiment of the invention.

DETAILED DESCRIPTION OF THE INVENTION

Figures 10, 11:
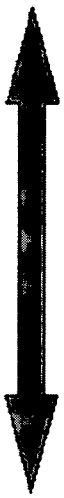
FIG. 10 illustrates how communications strategy planning may be performed during a single subphase of a planning phase according to an illustrative embodiment of the invention.
FIG. 11 illustrates types of participant interaction and when to use them according to an illustrative embodiment of the invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Much thought and consideration goes in to every training experience created for use in both commercial and non-commercial environments in order for the training experience to be effective for the participants. A training experience may also be referred to as a learning asset or educational product. The present invention defines a systematic approach for creating a training experience, regardless of training medium, that is surprising and delighting to the training participants, and provides a consistent level of excellence in its execution and results. Customer surprise may also be thought of as what a customer gets to perceive minus what the customer expects to get. A surprising and delighting training experience is one which goes above and beyond participants' expectations to deliver an experience that has a meaningful, memorable impact. As used herein, the term training experience refers to the entire training process, from advertising a training program to enrollment, execution (participation), results (e.g., grading participants, if desired), and follow-up.

Excellence in execution includes maintaining professionalism, giving due care and consideration, and meeting a minimum level of quality, all of which require effort on the part of the training experience creators and administrators in all aspects of the training experience. All aspects generally include the learning experience, the guest experience, the networking experience, and the enculturation experience. The learning experience component refers to the knowledge that a participant learns from the training experience. In order to provide an effective and efficient learning experience, the training should include expert faculty, authentic business problems, relevant and immediately applicable information, challenging problems, coaching tailored to individual needs, new or innovating instructional approaches, access to enablers, and collaboration and interaction among participants. The term 'enabler' refers to a learning asset or educational product that allows for the transfer of knowledge and/or for an individual to acquire a skill. In developing a phenomenal learning experience segment, the training experience creators preferably concentrate on performance outcomes, not simply on a desired amount of content, and tells an easily describable story (each part of the experience is part of that story). The instructional portion preferably challenges participants' existing mental models of approaching problems, and groups participants based on learning needs. For example, teams are not structured to perform a one-person task if something is best learned or accomplished individually—find a way to accomplish individual achievement even in a group setting. In order to transition participants from the "real world" to the training experience, pre-requisites should be included, and post-requisites may be used to transition participants from the training experience back to the "real world."

The guest experience component generally refers to the training participant's level of interest and focus during the training experience. In order to provide an effective guest experience, the training should be memorable, logistically and administratively simple, have stable technology, be engaging, and make effective use of face-to-face time. Phenomenal guest experience segments preferably include one or more of the following: minimize hassle and streamline administrative processes; easy to register and/or obtain learning product; minimal/appropriately timed communications (only the information you need and only when you need it); easy/quick check in at facility (for classroom products); maps/signage (if appropriate) to mark the classrooms, provide directions to events, etc. (for classroom products); have customer service at the forefront—everyone that guests (participants and faculty) come in contact with should be friendly, smile, and be willing to help (for "live" products); have a professional look and feel (strong writing, graphic design, media); include opportunities for fun, relaxation, and recreation; provide for periodic breaks in the learning for guests to recharge and refresh, and reconnect with their "real life"; personalize the guest experience wherever possible, so that faculty and participants feel they are a valued part of the sponsoring organization (e.g., ask a participant's supervisor to write a note of support and encouragement to a participant taking a challenging course); take place in a quality facility (for classroom products); rooms/environment should be comfortable—uses the right light, temperature, minimal external noise/distractions, etc.; and if the training experience uses technology, the technology should be easy to use and work flawlessly an extreme majority of the time.

The networking experience component generally refers to the opportunity for interaction among participants during a training experience in which multiple participants participate (e.g., a single-user computer based training typically does not include a networking experience component). In order to provide an effective networking experience and allow participants to build relationships the training should provide for social interaction among participants' peer groups, allow participants to meet new people or get to know current colleagues better, provide interaction with experts in the relevant field, and allow for follow up with the faculty off-line (i.e., at a time other than during the primary instructional period, e.g., during breaks or after the training experience is over). Phenomenal networking segments preferably include one or more of the following: connects participants by having them engage in challenging situations and problems; is aware of group dynamics; supports mid-course correction if problems exist (for live sessions); builds relationships between participants and faculty, as well as amongst participants; facilitates contact with individuals outside the immediate learning experience (e.g., provide a contact list); as appropriate, takes advantage of technology to facilitate networking; includes purely social interaction as well as business-focused interaction; and provides opportunities for free-form, "small talk" discussions.

Finally, the enculturation experience component refers to the integration of the training experience participants into the culture of the organization providing or sponsoring the training experience. In order to provide a rich enculturation experience, the training should be personally supported by the leadership of the sponsoring organization, provide a sense of professional community, import a strong feeling of belonging, not overwork the participants, and be tailored to any unique or identifying characteristics of the sponsoring organization. Phenomenal encultural segments preferably include one or more of the following characteristics: reinforce (and highlight as appropriate) the sponsoring organizations core values and/or code of business ethics; inform participants of the sponsoring organization's history and heritage; are branded with the sponsoring organizations logos, trademarks, service marks, and trade dress in all activities, materials, etc.; teach participants not just what not to do, but encourage them to take proactive, positive actions, both in their job/role, and also in their careers; make participants feel like they are part of something important—foster a sense of community and belonging; use effective storytelling techniques to communicate corporate history and lessons; and select faculty who are role models who can get participants excited about the sponsoring organization's culture.

When each of the learning, networking, guest, and enculturation segments are properly developed, the training experience is said to achieve phenomenality. In addition to the above four segments, by focusing on the participants for a particular training experience, one or more segments (i.e., learning, networking, enculturation, and guest) may emerge as more or less important than other segments, thus receiving more attention during the training experience. For example, networking might be more important for workshops where managers interact with each other than where staff members learn a new skill; enculturation is especially important for participants new to the sponsoring organization (e.g., new employees to a company); and the guest experience may be particularly important when senior management is participating in the training experience. Regardless, audience analysis improves the learning experience by targeting the content to the focus of the audience, making the content more relevant over a longer period of time than otherwise possible. Those of skill in the art will appreciate that the above four segments are illustrative and additional segments may be included. In addition, each segment is not limited by its nomenclature, but rather by the characteristics it exhibits.

The training experience in general begins with the first contact with a participant (e.g., advertising a training experience), and continues until the last contact with the participant (e.g., the end of the instructional portion of the training experience). A goal of the entire training experience is to retain each participant's attention to he or she can learn and improve performance.

For any given training experience a variety of delivery venues may be used for the direct training portion. The instructional portion of the training experience may be provided in a face-to-face (FTF) classroom environment, a virtual classroom environment (e.g., video teleconferencing or similar technology), or via single user computer-based training (CBT). The type of delivery venue may also affect the import of each segment. For example, one generally cannot achieve a higher networking experience in a virtual classroom than in a CBT, and even more networking experience in a FTF environment.

In creating a training experience, one should be mindful of the desired result—achieving phenomenality—and consider each of the learning segment, networking segment, enculturation segment, and guest segment. One should also focus on the entire training experience, not just the instructional portion of the training experience, and brainstorm to develop changes or enhancements that will both surprise and delight participants. In creating a phenomenal training experience, the experience creators preferably concentrate on the desired performance outcome, not simply covering a pre-set amount of instructional content. Effective tools include providing participants with challenging problems, presenting new ways of thinking or unconventional approaches to solving problems, and telling anecdotal "war stories" from which participants can learn from others mistakes (stories of mistakes or failures are often more powerful learning tools than telling participants how to do something). The training experience preferably maintains a consistent storyline from first contact to last. During the training experience, the creators should take care to proactively identify anything that might distract from each participant's experience, and systematically remove those items.

The above generally describes achieving phenomenality in the overall training experience. However, depending on the delivery venue for providing primary instruction (classroom, CBT, virtual seminar, virtual workshop), differing aspects may need to be accounted for in order to provide a phenomenal training experience. A virtual seminar refers to a shorter educational asset whose primary goal is to build knowledge and awareness, whereas a virtual workshop refers to longer educational assets (e.g., more than an hour or two) whose goals are to impart skills on its participants.

Classroom offerings may include workshops, workshops with simulations, classroom instruction, and hands on labs. CBTs may include playback of audio or video, interactive computer software, computer-based simulations, or even paper-based workbooks. Paper-based workbooks, while not computer implemented, can achieve the same goals as a some interactive computer software and many of the same phenomenality characteristics thus apply.

Classrooms are effectively used when there is a need for collaboration or interaction in the training experience. Classrooms allow participants to understand and absorb content in a socially interactive environment, while also providing participants the ability to connect, or reconnect, with the entire audience. In developing a classroom-based training experience, the training experience creators should be mindful of the following:

Agenda/timing—Adopt a "less is more" approach by including sufficient time for reflection, discussion, and assimilation of content. This allows for the possibility that participants might pick up unplanned for intangible content.

Faculty—Faculty should have content expertise, but they should also have a story to tell and a desire to teach and mentor those in the class. The faculty should be excellent communicators. Do not use faculty who simply are the "expert" or because their role says they should be appropriate.

Content focus & delivery—Minimize the amount of material delivered through presentations ("talk at" mode) and only design/deliver the content that will achieve documented performance outcomes.

Activities/group work—Focus discussions and activities on problems that the group needs to solve. Problems should be complex enough that multiple solutions are possible and that various points of view are needed to come to a good solution. Inputs for activities should be simple, with as minimal data as possible to do the task.

Feedback/debrief—Much learning occurs AFTER the activity when groups can discuss process and outcome and get feedback on their ideas or deliverables. Allow plenty of time for feedback/debrief and make sure it is structured to draw out insights.

Networking—The training experience brings people together. The creators should make sure that there is time and a mechanism to enable business-focused networking. Do not assume that this goal will be achieved by participants going to lunch together and working in groups during the course.

Faculty prep—Teach faculty to work within the defined environment and provide guidance for using the free time, or "white space," in the agenda. Provide plenty of time for the faculty to identify the stories they will share and to privately rehearse any presentations/discussions they will lead.

Computer based training (CBT) may be used when the outcomes and content of a training experience are easily or best learned and/or practiced individually. CBT is also useful when instructional messages need to be consistent, allowing little room for variation of content from one participant's training experience to another, or when the instructional content is reasonably stable and unchanging. CBT can also be used when there is a large participant pool and only a few qualified faculty who know the content and are capable of providing instruction. In developing a CBT training experience, the training experience creators should be mindful of the following:

Access & usability—The CBT course should be easy to get to and to use (e.g., simple navigation, free of technical defects). Otherwise the training experience risks being a waste of the participant's time and energy.

Information structure & design—Determine whether content and activities need to be completed in linear fashion (or not) and design accordingly. Enable participants to select relevant content, and opt-out of redundant or unnecessary content. Keep things interesting through the choice of appropriate and/or varied media (graphics, models, tables, etc.).

Activities—Activities should occur at appropriate intervals and be appropriate to the type of content when reinforcement and practice are logically called for. Focus activities around the application of the information that the training experience provides.

Writing/editorial—Invest in the writing that will appear in the CBT and make sure that it is edited carefully. Poorly written material in terms of substance/structure, grammar, or punctuation distracts participants and detracts from the overall quality of the training experience product.

A virtual seminar instructional vehicle may be used when the goal is information dissemination, as opposed to skill-building. Virtual seminars are an effective delivery mechanism when the content is new or constantly changing, and there are a lot of people to train while only a few experts who know the content. In developing a virtual seminar training experience, the training experience creators should be mindful of the following:

Sponsorship—Strong endorsement or sponsorship by senior management of the sponsoring organization is often essential for a successful virtual seminar because participants are often predisposed to believing that seminars are "boring."

Registration & Access—The training experience must be easy to register for (if needed) and attend (i.e., no technical issues).

Communications—Communications must be well planned, clear and precise

Interaction—Build audience interaction into the design, as well as the ability to ask questions of the expert presenters Finally a virtual workshop is an effective instruction delivery vehicle when only short amounts of live interaction are needed, making classroom events impractical. For some organizations, e.g., a consulting company, classroom events might only be used when 3 or more says of classroom interaction are desired. Those of skill in the art will appreciate, however, that there is no set time limit for virtual workshops versus classroom instruction. In developing a virtual workshop training experience, the training experience creators should be mindful of the following:

Pacing—Provide frequent breaks; do not have participants sitting for long stretches of time in a virtual real-time collaboration environment.

Chunking—Stretch the learning over a longer duration than otherwise necessary. For example, 2 days of training is often best conducted as 4 half-days rather than in 2 consecutive, full days.

Activity Focus—Minimize lecture and theory. Concentrate on team activities, and ensure that activities are real, relevant, and work towards a common team goal.

Networking—Include networking opportunities and social activities.

Variety—Structure a mix of individual activity and group discussion. Discussion works best in small groups led by an experienced facilitator.

With reference to FIG. 1 an illustrative development cycle 101 for developing a training experience will now be described. The timeline 101 progresses through the assessment stage 105, planning stage 107, building stage 109, pilot stage 111, deployment stage 113, and evaluation stage 115. The planning stage may be split into two more sub-stages 107a, 107b, as further described below. Throughout the development cycle occurs program and relationship management 103. By the end of the assessment stage 105 occurs the project definition milestone 117. As used herein, a milestone refers to the creation of a specifically defined thing or item (e.g., a document, software, etc.) that can be reviewed and approved before proceeding with the training experience creation process. During the planning stage 107 occurs the planning summary milestone 119, by which time a planning summary document has been developed. The end of the planning stage 107 is marked by the course requirements milestone 121, at which point the course requirements have been defined in written or tangible form. The training experience may then proceed to the building phase, during which a pilot course may be performed, resulting in possible revisions prior to deployment of the training experience in phase 113. Evaluation 115 may occur concurrently with deployment 113.

In order to ensure that the training experience achieves phenomenality, certain checkpoints 123, 125, 127, and 129 may be defined during the training experience development cycle 101. A shaping checkpoint 123 may occur in the form of a meeting of relevant parties (e.g., training experience creators, users, sponsors, etc.) to discuss the assessment and determine initial inputs for the planning phase 107. A planning review checkpoint 125 may include a second meeting to discuss the planned training experience. A validation checkpoint 127 may include a meeting to review the initial portions of the building phase, and a delivery review checkpoint 129 may include reviewing the initial deployment and revisions that might be useful as a result of the evaluation performed to date.

The training experience creators (e.g., the sponsoring organization, independent creators, etc.) determine, during the assessment phase 105, the training needs that are to be addressed by the training experience. During the assessment phase 105 the training experience creators identify and determine the business case/rationale for the training experience, performance goals of the target audience, who the target audience is, gap closure strategy, content and scope requirements (to a limited extent), design and architecture needs, delivery strategy, measurement strategy, and project expectations by the sponsoring organization.

The assessment stage may include identifying the business opportunity or problem to be addressed and the desired business outcomes (business case/rationale), determining the desired performance from the target audience (e.g., what is happening that should not be happening? or what is not happening that should be happening?) and the desired performance outcomes (performance goals), assessing known information regarding the target audience, determining the appropriate suite of enablers to address the business opportunity or performance problem, determining the content areas to be covered in the training experience and determining how they relate to other courses (training experiences) in the curriculum, identifying the type of learning asset (e.g., classroom, CBT, etc.) that is the best vehicle to achieve the intended outcomes (also referred to as gap closure), and assessing whether the learning asset should be custom-built or purchased from a vendor.

The business case/rationale may be more fully elaborated upon by determining the business drivers of the training experience (e.g., why is this training experience needed?), determining the business opportunity or problem to be addressed and any tangential issues, including assessing a quantifiable value to the training experience. The training experience creates may also determine an appropriate investment level to make in the training experience (both in terms of development and delivery cost), given the audience, performance outcomes, and overall impact the solution will provide. The business case is also affected by the urgency of the problem being addresses, and determining how quickly the training experience needs to be implemented to provide the most value.

The performance needs can be more fully assessed by determining what evidence of the problem currently exists. For example, determining that something is happening that should not be happening, or by determining that something is not happening that should be happening. Then the training experience creators can determine the desired performance outcomes (e.g., a performed event, or an omission of an error), the allowed margins of error for the performance outcomes (e.g., must the participant absolutely get it right?), and factors that the training experience creators can control to influence participants to achieve the desired outcome. Performance assessment may include determining what a participant must do to achieve something, identifying any factors that prevent the participant from doing that something, and identifying key decisions need to be made in order to achieve the outcome (e.g., what is the gap between present behavior and desired behavior?).

Target audience assessment generally includes identifying what is known about the target audience. For example, target audience assessment may include identifying the demographics of the target audience (level of job stature, affiliation, physical location, size of total population of organization, etc.). Other information that may be useful includes whether the target audience in general is expected to have preexisting knowledge and experience with the subject matter of the training experience, and whether the intended audience (or part of the audience) needs or requires any prerequisite material or experience prior to the training experience, given the content/outcomes targeted for the course. Audience preferences, attitudes, and motivation may also be taken into account, as well as whether there is a secondary audience that should be taken into account (e.g., management personnel, where the primary target audience are staff personnel supporting management personnel).

Content and scope may be assessed by determining, based on the desired performance outcomes, the content domains or areas that need to be covered (as well as their relative weight or priority levels), as well as determining how the content and training experience relate to other training experiences in the existing curriculum.

The training experience architecture may be assessed by determining, based on the desired performance outcomes, the nature of the content and the audience, and the availability of qualified faculty. This will allow the training experience creators to determine what type(s) of learning asset(s) is/are the best vehicle to achieve the intended outcomes, and whether the training creators should build or buy the delivery mechanism.

Delivery requirements assessment preferable includes determining the expected volumes for the course (e.g., one session, two, etc., and over what period of time?), and the desired penetration (e.g., how many participants and people by when?). Delivery requirements assessment may also include specifying a "catch-up" strategy for those who fall outside the target audience but may need the training, and determining whether the training is required. If the training experience is required, assessment should include specifying who it is required for, and the rationale for requiring the training. Delivery requirements assessment may also include determining potential delivery costs, constraints or requirements of the selected learning asset type, and how people will use the course. If the training experience will be delivered via classroom, the training experience creators should consider where the sponsoring organization wants the training experience to take place. If the training experience is self-study, identify where participants will take the training (e.g., on a plane during travel down-time, access it from home, at a client-server site, etc.). The assessment phase should also include consideration of how one can determine whether the training experience is delivering the intended business outcome.

Finally, the assessment phase 105 preferably includes an assessment of project or management expectations for the training experience. Expectation assessment may include identifying the best sponsorship and/or governance model for the course, identifying key stakeholders, the sponsoring organization, milestones and/or deadlines, and development resources needed to help with planning and design of the training experience.

Once the assessment phase 105 is complete, planning 107 of the training experience begins. Planning includes providing further specificity to each of the assessed areas, as well as specifying training experience data for other non-assessed areas, as further described below. The planning phase may be subdivided in many sub-phases, with each phase providing more specificity than the previous sub-phase and building upon the previous sub-phases. Those of skill in the art will appreciate than any number of sub-phases may be used. For illustrative purposes the planning phase is described herein with respect to two sub-phases 107a and 107b.

A first planning subphase 107a may initially include determining what the participant needs to achieve or do in each content area and how the content should be ordered in the course; identifying the initial learning objectives and preliminary, high-level instructional approach that should be used to achieve them, identifying the technology (if any) that is required to deliver the training experience, and identifying the faculty for the course and how participants will attend the course. Also during the planning phase the training experience creators may determine how will the feasibility of the training experience design can be tested before proceeding with development, as well as the anticipated shelf life and update strategy for the training experience.

In a following subphase 107b, each area from subphase 107a may be refined with further specificity. For example, during subphase 107b, the training experience creators may determine the frameworks, processes, decisions, and obstacles that relate to each content area, identify activities that may be needed to achieve the training experience objectives and determine how participants will be supported to complete course activities, and determine detailed technology requirements including any required products to use and their design. With respect to faculty, the training experience creators may determine what faculty and delivery support roles are required for delivery of the course, as well as how the training creators can test the course content and technology, and measure participant learning. Brainstorming regarding marketing and advertising for the training experience is preferably begun, as well as determining the roles, milestones, and risks associated with the building phase 109.

FIG. 2 illustrates how content and scope requirements planning may be split between first subphase 107a, and second subphase 107b, according to an illustrative embodiment of the invention.

FIG. 3 illustrates how architecture and design requirements planning may be split between first subphase 107a, and second subphase 107b, according to an illustrative embodiment of the invention.

FIG. 4 illustrates how technology planning may be split between first subphase 107a, and second subphase 107b, according to an illustrative embodiment of the invention.

FIG. 5 illustrates how delivery requirements planning may be split between first subphase 107a, and second subphase 107b, according to an illustrative embodiment of the invention.

FIG. 6 illustrates how testing/review strategy planning may be split between first subphase 107a, and second subphase 107b, according to an illustrative embodiment of the invention.

FIG. 7 illustrates how project and expectations management planning may be split between first subphase 107a, and second subphase 107b, according to an illustrative embodiment of the invention.

Some aspects of planning may occur only during a single subphase of the planning phase 107. For example, FIG. 8 illustrates how measurement strategy planning may be performed during a single subphase according to an illustrative embodiment of the invention. For example, FIG. 9 illustrates how maintenance planning may be performed during a single subphase according to an illustrative embodiment of the invention. For example, FIG. 10 illustrates how communications strategy planning may be performed during a single subphase according to an illustrative embodiment of the invention.

Once planning is completed, building of the training experience occurs in phase 109. During building phase 109, when the initial training experience is completed, a pilot training experience 111 is conducted to ensure that the training experience is built properly. Based on the pilot the training experience may be further modified during the build phase 109 prior to launching the training experience into the deployment phase 113. Deployment 113 and evaluation 115 may occur concurrently so as to be able to refine the deployed training experience based on the evaluations received.

As briefly discussed above, certain milestones and checkpoints may be used to ensure that the training experience achieves phenomenality. The project definition milestone 117 occurs at the end of the assessment phase 105 and is marked by the delivery of a project definition report. The project definition report is an introductory document that provides details regarding the business rationale of the training experience, course goals, the target audience, and the positioning in of the training experience in the entire curriculum offered by the sponsoring organization.

The planning summary milestone 119 is marked by the delivery of a planning summary report, which in addition to providing more details regarding the subjects covered in the project definition report, provides additional information useful to build the training experience. The planning summary report may include information regarding course content and scope (e.g., prioritized content domains, performance outcomes, a content map, and prerequisite requirements), the delivery approach of the training experience (e.g., delivery type and length of program components, annual throughput and number of sessions per year, delivery location and mechanism, delivery cost requirements and constraints, and faculty needs), and program expectations and management (e.g., course sponsors, content sponsors, roles and responsibilities of persons involved with the training experience, key assumptions and risks, critical dates by which the training experience should be initiated or concluded, and budget).

The course requirements definition milestone 121 is marked by the delivery of the course requirements definition report at the end of the planning phase. The course requirements definition report is the principal document from which the training experience is built, and may include information detailing course goals and outcomes, content and learning design (e.g., the course map, module designs, case strategy, and materials to be used), technology strategy (e.g., overall technology approach and technology designs), delivery strategy (e.g., faculty and support personnel needs, faculty preparation guidelines, defining the physical learning environment for classroom-based courses, and estimated tuition if any), measurement strategy, testing and review strategy, maintenance strategy, communication strategy, and the development schedule, budget, assumptions, and risks.

As discussed briefly above, certain checkpoints may be inserted into the training experience creation process 101 in order to ensure that the training experience achieves phenomenality. These checkpoints may include project shaping 123, a planning review 125, validation 127, and delivery review 129. The phenomenality checkpoints ensure that the resulting training experience is an outstanding (i.e., phenomenal) learning asset to the sponsoring organization, that the training experience scores well on evaluations, and that participants find the training experience beneficial to their lives, jobs and/or careers. The phenomenal learning model and checkpoints described herein are tools to guide and support the creation of phenomenal training experiences.

Each checkpoint may occur in the form of a group meeting including all relevant training experience creator personnel, or may include a group meeting or one on one meetings by a phenomenality reviewer assigned to the project with each of the training experience creators. The phenomenality reviewer is preferably not part of the day-to-day training experience creation team, but rather is an outside or independent reviewer who may also be held accountable by the sponsoring organization for the overall quality of the training experience which he/she reviews. Depending upon the type and complexity of the training experience being developed, a project might not need all of the checkpoints referred to in FIG. 1, and phenomenality checkpoints might occur at times other than those listed in FIG. 1. For example, for relatively simple training experiences (assets with a single content domain, short length, rigid architecture, etc.), a single review meeting toward the middle or end of planning may be performed; whereas, for more complex assets (assets with multiple content areas, longer in length, live classroom events, etc.), including several phenomenality checkpoints will provide useful.

The shaping checkpoint 123 allows the training experience creators to generate ideas about how phenomenal principles will be applied to the training experience. The shaping checkpoint also allows a solution planner to learn about the training experience being developed. A solution planner, also referred to as a Curriculum Owner, Curriculum Manager, Educational Product Owner, and/or Educational Product Manager, refers to the individual(s) structuring the curriculum and/or creating the educational product or learning asset. The shaping checkpoint preferably results in development of an initial course framework reflecting phenomenal principles, and the training experience creation team gaining ideas to further investigate and develop to make the course phenomenal.

The shaping checkpoint 123 may occur in the form of a team meeting with hands-on subject matter experts (SME) to determine desired performance needs, high-level content, design approach, etc., and may optionally include a phenomenality reviewer. The shaping meeting may or may not include a representative from the sponsoring organization, as desired. The meeting may be as short as 1-2 hours for simple training experiences, or may last much longer for more complex training experiences.

A purpose of the planning review checkpoint 125 is to allow to the training experience creation team to confirm that what they have designed will achieve the performance outcomes and be considered phenomenal. The planning review also results in the team having a list of concrete actions to implement and risks to manage during the build phase. During the planning review checkpoint a solution planner and a phenomenality reviewer agree whether the validation checkpoint 127 needs to occur (skipping the validation checkpoint will be rare, but possible). A planning review meeting may be conducted by the solution planner with a phenomenality reviewer using the final planning documentation as the basis for the discussion. The meeting is preferably no more than a few hours in length, and should not need to special documentation prepared for the meeting. The planning review meeting is somewhat of an informal check to ensure that the training experience creation process is on the right track to achieve phenomenality.

A purpose of the validation checkpoint 127 is to validate that the team is (or is not) on track to make the training experience phenomenal before the team is very far into the build phase (i.e., it is not too late to make adjustments if needed). A validation meeting allows for the validation of the current direction and provides a venue to suggest ideas for changes and how to address any suggested changes. The phenomenality review should be included in the validation meeting, which uses any in-progress design/build documentation (e.g., detailed designs, revised course map, relevant course materials, etc.) as the basis for the discussion. The meeting is preferably no more than a few hours in length, and should not need to special documentation prepared for the meeting. The planning review meeting is somewhat of an informal check to ensure that the training experience build phase is on the right track to achieve phenomenality. Those of skill in the art will appreciate that, depending upon the nature of the training experience and the phenomenality reviewer's comfort level with the plan and the way build is progressing, this meeting may not be needed.

A purpose of the delivery review checkpoint 129 is to gather and review data to understand the reasons for received to-date course ratings scores, and determine whether learning targets are being achieved. The delivery review also allows the training experience creators to understand the implementation of the phenomenal learning model 101, particularly things which are difficult to ascertain from reviewing course materials or evaluation scores (e.g., the guest and networking experiences), and to connect with the target audience to gain a deeper or more refined understanding of the audience and what they need from the training experience (this can be used as input for future course improvements or other curriculum needs). The delivery review should result in qualitative data to explain and/or support course ratings, and a plan for maintenance actions or the decision to retire the training experience (if needed). Delivery review checkpoint 129 may be repeated at regular intervals as long as the training experience is in production or being performed. The delivery review may include a review meeting to discuss evaluation scores and revisions to the course, and may also or alternatively include observation of the training experience (or parts thereof), informal focus groups with participants and/or faculty, a question/answer meeting with the sponsoring organization, training experience manager, and/or the training experience delivery support team. A phenomenality reviewer may assist with the delivery review process and the creation of any plan to improve a training experience in order to achieve course ratings targets.

ILLUSTRATIVE EXAMPLE

By way of example and not limitation, the following paragraphs provide an illustrative example of planning a training experience, here, a virtual seminar or series of virtual seminars. This example covers session scheduling (how frequently and when should sessions be scheduled), topic selection (what topics should be included in the program?), presenter selection (what makes a good presenter?), and leadership support and endorsement (how can a program sponsor be effectively engaged?).

Session Scheduling. To be effective, individual virtual seminars are preferably scheduled as part of an overall program or series of events, rather than as individual ad-hoc events. Having a schedule in place will help set participant expectations and facilitate planning. This section helps with scheduling the right number of sessions, on the right day and at the right time.

Session scheduling may take place once a year, every six months, every other month, or more frequently. Some programs are suited to conducting events on a "semester" basis, with events running from February-June and then September-November, taking a break over the summer and New Year. In such a semester basis, sessions may be scheduled 6 or more months in advance, with topics confirmed just 2 months in advance. It is important to be consistent and plan in advance in such a situation.

Frequency of training experiences may be weekly, monthly, bimonthly, quarterly, etc. To determine how often to conduct training experiences, take into consideration the expected number of high value topics the sponsoring organization may have over a given period. Once the frequency has been determined, the day and time should be selected. Preferably, sessions within a single training experience should be scheduled at the same time each day and on the same day of the week. This consistency helps establish participant expectations. In determining the best day and time, take the following into consideration:

Geographic location: For a global audience schedule more than one session per topic to accommodate participants in various time zones and locations. If the target audience is mostly in the US and Europe then most people can participate by conducting the session at 9 am U.S. virtual real-time collaboration environment time, which is 4 pm in Paris and virtual real-time collaboration environment Europe. However, additional sessions will likely also need to be scheduled to accommodate other participants (e.g., U.S. west coast, Asia, Australia, etc.). In addition, daylight savings changes should be taken into account. Europe and Asia Pacific (APAC) usually change one week earlier than the U.S.

Level of participants: Lower level participants (e.g., staff, analysts, etc.) tend to be more flexible than more senior levels (e.g., managers, partners, executives, etc.). The beginning and the end of the day tend to be good time slots for senior level participants, but this is not a steadfast rule or limitation.

Travel Schedules: The travel schedules of participants should be taken in to consideration for planning a training experience. For example, in some consulting companies, the consulting workforce generally travels to the client site on Monday mornings and home again on Thursday evenings. Scheduling should be planned with factors such as that in mind.

Holidays/Vacation Periods: Confirm any holidays endorsed by the sponsoring organization to determine which days the intended participants are off work. Also, be aware of varying vacation practices around the world in the case of a global audience, e.g., U.S. personnel tend to take extended vacation around the New Year, Independence Day and Thanksgiving holidays. Whereas European personnel tend to take extended vacation around Easter, New Year and during the entire month of August. Asian personnel may observe yet different holidays (e.g., for Asian Pacific, the Chinese New Year).

Internal events: Preferably avoid other internal events and meetings of the sponsoring organization.

Organization standards: the sponsoring organization may have standard days and/or times when internet training or events should take place. Check with the sponsoring organization to confirm if this is the case.

Topic Selection. Topics included in a virtual seminar series should be relevant to the target audience and may include one or more of the following, and/or other topics altogether:

Thought leadership

Points of view

New frameworks and tools; methods awareness and enablement

New market offerings—cross-industry, industry-specific, service-line

Best practice case examples

Organizational updates

The target audience is usually defined by one or more of the following characteristics:

Level

Geography

Organization and/or interest group

Having a good understanding of the target audience also helps with content selection. For example, if the audience is global and the training experience should include a number of case studies, case studies from the various geographies should be included, not just case studies from the United States. Also, make sure topics included in the program are sufficiently backed up by research and are ready to share with the participants; i.e., that they are ready for "prime time" and are backed up by sufficient research, case studies and other supporting materials such that the topics' integrity cannot be questioned.

Topics may also be determined in conjunction with the management from the sponsoring organization and/or subject matter experts. It may take several meetings to generate ideas and follow-up before topics can be finalized. It may also be necessary to re-visit the plan every few months as presenter schedules, organization focus and priorities change.

Presenter Selection: As with classroom based courses, the quality of the presenter can "make or break" a session. Thus it is important to select the right presenter(s) for your program. As a general rule, presenters should be global subject matter experts and/or senior executives in their respective fields. A presenter's verbal presentation skills and accents should also be taken into account. For example, non-native English speaking participants may find it challenging to follow the discussion if the presenter has a strong accent that the participant is not familiar with. Well known names can increase attendance and bring credibility to a session, as can repeat presenters who have performed well in the past.

Senior Leadership Support: the senior management or leadership of the sponsoring organization preferable supports and endorses the training experience. As a best practice, it is recommended that senior organization leadership (e.g., president, vice-president, division manager, etc.) sign off on topics and presenters as appropriate. This is an effective way to obtain senior leadership support and endorsement and to ensure that the program is aligned with overall organization goals and focus.

Virtual seminars often become the most visible and direct communication channel for a sponsoring organization. It is therefore preferable that senior leadership be involved and engaged. In planning a training experience, one should consider having senior leadership present periodic organization updates and/or kick-off important topics.

Once the program schedule, topic and presenters are confirmed, the following paragraphs may be referred to for tips and best practices for designing and building the actual training experience which, in this example, is a virtual seminar or series of virtual seminars.

Overview: while the following paragraphs primarily focus on the design of individual virtual seminars, this guide is also helpful at the program level as a new Virtual Seminar Series is being planned or an existing on is retooled. These paragraphs provide best practices based on other Virtual Seminar Series programs that have been implemented.

A Virtual Seminar Series is an ongoing set of virtual classroom based events preferably implemented with a virtual real-time collaboration environment. The virtual seminar series is preferably sponsored and administrated by the sponsoring organization. A virtual seminar contains a specific type of content, and is intended to share knowledge and awareness of a particular topic with a large audience (e.g., 50 or more participants). A virtual seminar series is not intended to build deep skills in an audience, or to accommodate small audiences (while small audiences will also benefit, it is often not cost effective).

After developing many virtual seminars, the inventors have determined best practices for designing virtual seminars. The following paragraphs walk through the following design process:

Designing the Content

Designing the Interaction Model

Designing the Materials

Implementing the Seminars

While the virtual seminar design process is presented here as a linear process, it is not necessarily so. One might skip, rearrange, or iterate on design steps.

Timeframes for the Content Development Cycle. Communicating with content developers and faculty well in advance helps ensure materials for the virtual seminar are developed on time and avoid last minute "fire drills." Below are recommended development timeframes:

- 8 weeks prior to the session: Finalize and confirm topic, faculty and content developer(s) for the session.
- 5-6 weeks prior: Start with the development process described below. Communicate due dates, templates (Save the Date & PowerPoint templates) and expectations to faculty and content developer(s).
- 2-3 weeks prior: communicate with content developer(s) and faculty to confirm that development is on track and check to see if they have any questions.
- 12-14 days prior: Due date for "Save the Date" content. See the paragraphs on "Promotional Announcements" below for more information.
- 8-10 days: Distribute "Save the Date" Announcement.
- 5-8 days prior: Finalize content and materials.
- 2-3 days prior: Distribute materials to participants (if required).
- 2-3 days prior: Load materials into virtual real-time collaboration environment, if required.

Designing the Content. Here is an illustrative process to follow when designing content for a Virtual Seminar:

- Define your learning objectives
- Select your content
- Determine the design flow needed to teach and reinforce the content Although listed sequentially, this is not always a linear process. The designers preferably start by defining learning objectives, but then might iterate between selecting content and designing the flow. As a result, the designers may go back and modify the learning objectives. It is not the sequence of the process that is important, but rather that the design process results in clearly defined learning objectives, with content and a flow that makes those learning objectives happen.

Defining Learning Objectives. When developing learning objectives for the session, keep in mind that the intent of a Virtual Seminar is to disseminate knowledge. Deep skill building is often better left for other training vehicles, such as multi-session classroom training experiences. Therefore, an effective way to develop learning objectives is to identify the top three-to-five things the sponsoring organization wants people to know at the end of the virtual seminar session. Below are samples of effective learning objectives for a virtual seminar session:

- Describe offering 'x' at a high level.
- List the key selling points of offering 'x'.
- Understand how offering 'x' was implemented at client 'y'.

Below are examples of not-so-good learning objectives for a virtual seminar session:

- Develop a detailed proposal around offering 's' (too detailed for a virtual seminar session).
- Practice selling offering 'x' to a client (difficult to implement over a virtual on-line collaborative environment).
- Have the skills necessary to implement offering 'x' at any client.

Selecting the Content. After determining the learning objectives, the designers select the content that teaches and reinforces the determined learning objectives. The content is preferably listener-centric, or geared toward what the audience wants and expects to hear, as opposed to what the sponsoring organization, subject matter experts, and/or presenters want to tell them. When deciding whether to include content, the designers should ask themselves:

- Will the audience care about this?
- Does the audience really need to know this?
- Will the audience ever have a reason to apply this information?

If the answer is 'no' to any of these questions, the designers should leave the content out of the presentation. Content should also be backed up by real-life stories, examples, and experiences. When case studies and examples are not provided, participants often give the feedback that the content is too theoretical and cannot be applied in practice. Stories also help keep people engaged and attentive during the seminar. The designers preferably organize content/information into two or three levels: key points (three to five per learning objective), supporting information (to back up each key point), and additional information (if necessary, including references or parenthetical ideas). This organization of information becomes the basis of any presentations used in the training experience (e.g., a slide deck presented via PowerPoint® brand presentation software).

Determine the Design Flow. The best design flow will, of course, depend on the content you have identified, but a good design template that has been successfully used is as follows:

- Give an overview of all the learning objectives.
- Describe the first learning objective in detail.
- Provide three-to-five key points about the first learning objective.
- Tell a story or give a real-life example that illustrates the learning objective.
- Repeat steps 2 through 4 for each learning objective.
- Recap all the learning objectives Designing the Interaction Model. After determining the content for the seminar, the designers preferably consider how they want participants to interact during the virtual seminar. Interaction among participants reinforces the learning objectives, and helps keep participants engaged throughout the seminar. A useful rule of thumb is to design some type of interaction every three to five slides of a slide deck presentation. This can be any of the interactions discussed below, or some other type of interaction. It is important to pull the audience into the session and keep them engaged by asking them to interact and respond. Without this level of interaction, participants are more likely to drop off the virtual session earlier than the planned end of the session. FIG. 11 illustrates the types of interactions possible in some online collaborative environments, and when to use them. A virtual seminar typically uses those interactions above the horizontal line in FIG. 11.

When designing participant interactions, keep in mind that a virtual seminar is supposed to simulate a seminar, and not a workshop or a classroom course. Consider the types of interactions one would expect from a live seminar (e.g., "raise your hands if you've tried this," or, "does anybody in the audience have a question?"). If a type of interaction works in a live setting, it will likely work in a virtual setting as well. The following lists the interactions in the order of how commonly they are used in virtual seminars, and their relative effectiveness.

Using Text Chat: Text chat is one of the best ways to promote discussion and interest during the seminar. Here is an illustrative best practice for implementing text chat:

- Have one facilitator serve as the moderator for the text chat room. This moderator should be a subject matter expert in the topic of the seminar.
- Introduce the moderator at the beginning of the session, and encourage participants to discuss the topic in the chat room.
- Throughout the session, the chat room moderator preferably asks participants if they have questions about the content. If so, the moderator can answer the questions directly in the chat room, or they can wait and bring the question up during the live Q & A session.

Using Q&A: Question and Answer sessions may be a useful part of the Virtual Seminar training experience. To more effectively use Q&A sessions, consider the following:

- Plan on at least two Q&A sessions, placing one at the end of the seminar.
- The moderator can facilitate the Q&A session, balancing between questions from the chat room and live questions.
- Because participants sometimes have no questions, or they do not want to be the first to ask something, the moderator should prepare three to five questions in advance.
- To take live questions, ask participants to enter their questions in the chat room (or, if they are attending via conference call, to press '1' or some other key on the telephone keypad in an appropriate conference call system as is known in the art).
- At the end of the Q&A session, remind participants that they can enter additional questions in the chat room if there was no time to get to their question live.

Using Yes/No Questions: Yes/No questions are a quick and easy way to add some interaction. Simply ask a yes/no question, then ask participants to click "Yes" or "No" to answer. Some effective types of Yes/No questions include:

- Do you have experience with offering 'x'?
- Does this information make sense?
- Do you think you can apply this information?
- Have you seen this strategy in action?

Using Quick Surveys: Surveys take Yes/No questions one step deeper, by providing multiple answers to a question. When designing a survey as an interaction device, confirm that that the survey question can be easily and quickly answered. Avoid quiz-type questions, and remember that the goal is to keep people engaged with the content, and not testing their knowledge gain. Some sample survey questions might include:

- What geographic region are you from?
- On a scale of 1 to 5, how comfortable are you with this information?
- How many clients do you have who could benefit from this offering? (none, one or two, three or more, etc.).

Surveys may also be used to transition to another topic. For example, participants could be asked to guess "What percentage of total revenue do most companies spend on IT?" to lead into a discussion on IT expenditure.

Using Other Interaction Techniques: A virtual real-time collaboration environment often supports other types of interaction techniques such as application sharing and web safari (a web safari, often called a scavenger hunt, is an activity that encourages participants to find and evaluate resources available on the Internet. It is an excellent activity for having the participants extend their own learning resources and materials). However, application sharing and web safari might distract participants from the seminar. Instead, consider using screenshots of applications or web pages to discuss them. Remember that the goal is to share information in the seminar, not build deep skills that often necessitate a software demo.

Designing the Materials. After determining the content and interaction model, the slide deck should be created, e.g., using PowerPoint® brand presentation software (it is also possible to create the slide deck first and determine the content and interaction model based on the slide deck). Below are some basic guidelines for developing the slide deck. As with any presentation, the slides preferably include common elements, such as headers, footers, titles, captions, etc., to reinforce the theme of the training experience or the sponsoring organization. These common elements also help create a common experience for all Virtual Seminar Series seminars. The audience, over time, begins to expect to see these elements whenever they attend a virtual seminar. Using common elements also helps to create a comfortable, recognizable learning environment for the participants.

Other types of common elements include entire slides or types of slides common to each presentation. Examples of common elements thus might also include the following:

- Introduction to the virtual real-time collaboration environment and classroom protocol
- Faculty biography slides including brief resume and biographical background to give faculty credibility, and including a picture to increase audience engagement
- Contact information and additional resources
- Introduction to formal Q&A session The following presents some guidelines for creating slide decks. Keep in mind that in some slide deck presentation software programs, e.g., PowerPoint®, the virtual real-time collaboration environment format may appear smaller than standard PowerPoint® formatting. Thus, if the designer wants to see what a slide is going to look like in the virtual real-time collaboration environment, the designer should set the PowerPoint zoom to an appropriate percentage, e.g., 75%. Once the size differential has been accounted for, the designers can create readable, understandable slides. Other guidelines might include:

- Only include one key point per slide. The slides should provide key words and phrases to support what the audience needs to know. Presenters should not be reading detailed points from a slide. Instead, they should add insights and examples that provide context and understanding. Use the notes page to provide additional details for the instructors.
- Limit the amount of text on each slide. Three to six supporting points per slide and six to twelve words per line of text. Thirty-six or less total words on the slide.
- Use large fonts to improve readability. For example, key points: 14 point font or larger; supporting information: 12 point font or larger; charts and graphics: try to stay larger than a 10 point font. Only use a 10 point font when necessary, and almost never use font sizes smaller than 10 points unless absolutely necessary (confirm that font will be visible in presentation environment if used, as fonts less than 10 pt may be illegible in virtual real-time collaboration environments.
- Avoid italics, since they can be illegible in some virtual real-time collaboration environments.
- Support the key point with graphics and charts. This helps illustrate the concepts, and supports the needs of visual learners. Avoid overly complicated charts, which can actually distract the audience.
- Number all slides in the tagline (or title) for easy reference.
- Always follow the sponsoring organization's branding guidelines.
- Avoid special features (such as animations, sound, and video), unless confirmed that they will work in the virtual real-time collaboration environment environment.
- Use a simple design and include plenty of white space.

Implementing the Seminars. Once the slide decks have been developed, the designers still have to make some design decisions that can affect the virtual seminar experience. Here are some guidelines for implementing the seminars.

Establishing the Program's Home. As the designers begin developing the Virtual Seminar Series training experience, they should create a brand and sense of recognition for the program. This can be jump-started with a clever name (e.g., InFusion, Call & Learn, etc.) and visual motif. An effective way to build brand recognition is by offering a quality product, and generating word-of-mouth about the training experience. Once the name recognition starts (and even before, through hyperlinks in communications), the designers may establish an online home for the training experience. The online home is a place that people can visit to learn more about the program and how to get involved. The online home may include the following:

An overview of the program.

An upcoming session schedule.

A link to the live course.

Links to playback courses.

Setting up the Course. Before people can attend the seminar, the designers need to set it up as a course in the virtual online collaborative environment. The designers also need to register participants for the course prior to the course's start. Implementing the registration strategy is trickier than it sounds because the less one worries about registration, the easier it is for participants to sign on to the seminar, but the more registration steps put in place, the easier it is for the designers to track who is participating and plan accordingly. Pre-registration for live events has been found to work effectively. A link to an online web site where participants may register should be included in all communications regarding the training experience. Pre-registration allows the designers know how many individuals plan to attend each seminar can help to coordinate the seminar better, especially if there are multiple sessions of the same seminar.

When the content, the presentation, and the logistics have all been designed, it is time to start communicating the event. Promotional announcements may be used to advertise the training experience. A brief overview or marketing "blurb" for the session may be included in any save the date or other communications. Some useful tips for promotional announcements may include the following:

Make it memorable and engage your reader. People receive numerous emails every day—make yours one that people will want to read.

Include an overview of the topic and a clear statement of what participants can expect to get out of the session Include presenter names and qualifications Keep it brief—not more than 2-4 paragraphs.

Know your target audience and make sure your message is tailored appropriately.

Give your seminar a catchy and engaging title, e.g., o M&A & Alliances: How to Sell One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method for creating a computer-based training experience, the method comprising:

determining a desired performance outcome for participants in a computer-based training experience, wherein in the desired performance outcome is an outcome resulting from the training experience, and wherein the desired performance outcome includes a decrease in an undesired activity or an increase in a desired activity, and wherein the desired performance outcome includes an allowed margin of error for the decrease or increase;

identifying, by one or more computers, known information regarding the participants in the training experience, wherein the known information includes demographics of the participants and preexisting knowledge and experience levels of the participants;

determining an appropriate set of enablers based on the desired performance outcome and the known information, wherein the appropriate set of enablers includes one or more learning assets or educational products that allow for the transfer of knowledge to a participant or that allow for a participant to learn a skill;

determining an appropriate investment level to make in the training experience given the desired performance outcome, the known information, and the appropriate set of enablers, wherein the appropriate investment level is in terms of a development cost and a delivery cost for the training experience;

developing, by the one or more computers, a training experience according to the desired performance outcome, the known information, the appropriate set of enablers, and the appropriate investment level, wherein developing the training experience comprises:

developing a computer-based learning experience aspect of the training experience, wherein the computer-based learning experience aspect imparts knowledge on training experience participants through one or more computers, and wherein the developing includes determining what a participant needs to do in each content area of the training and how the content should be ordered, given the determined set of enablers;

developing a networking experience aspect of the training experience over a computer network, wherein the networking experience includes participant interaction with a facilitator serving as a moderator of the interaction that allows multiple training experience participants to interact simultaneously with one another and the moderator while participating in the same training experience;

developing a guest experience aspect of the training experience, wherein the guest experience aspect is designed to engage an interest and focus of participants by personalizing the training experience to show the value of the participant to an organization sponsoring the training;

developing an enculturation experience aspect of the training experience, wherein the enculturation experience teaches participants about the core values and code of business of the organization sponsoring the training and teaches participants about the history of the organization sponsoring the training;

analyzing the known information for the participants; and determining, by the one or more computers, an appropriate balance between the computer-based learning experience aspect, the networking experience aspect, the guest experience aspect, and the enculturation experience aspect of the training experience based on the analysis of the known information for the participants; and deploying the training experience.

2. The method of claim 1, further comprising:

testing the training experience by implementing a pilot training experience program;

revising the training experience based on the pilot training experience program; and wherein deploying the training experience comprises deploying the revised training experience.

3. The method of claim 1, further comprising, concurrently to deploying the training experience, evaluating the deployed training experience and revising the deployed training experience based on the evaluation.

4. The method of claim 1, wherein the training experience comprises one or more of a classroom-based training model, a computer-based training model, a virtual seminar, or a virtual workshop.

5. The method of claim 1, further comprising determining a business opportunity to be addressed by the training experience and a desired business outcome from the training experience.

6. The method of claim 1, further comprising determining a timeline for deploying the training experience so as to maximize a value provided by the training experience.

7. The method of claim 1, wherein identifying known information regarding the participants in the training experience comprises identifying a secondary audience for the training experience.

8. The method of claim 1, further comprising determining one or more delivery requirements for the training experience, wherein the training experience is further developed according to the one or more delivery requirements.

9. The method of claim 8, wherein the one or more delivery requirements include an expected number of sessions for the training, an expected period of time for the training, a desired penetration for the training, and whether the training is required.

10. The method of claim 1, wherein developing the training experience further comprises planning the training experience and building the training experience.

11. The method of claim 10, wherein developing the training experience comprises:

specifying a shaping checkpoint during which relevant parties meet to discuss an initial assessment of the training experience needs;

specifying a planning review checkpoint during which the relevant parties meet to discuss a plan for the training experience;

specifying a validation checkpoint during which the relevant parties meet to review initial portions of the training experience as the experience is being developed; and specifying a delivery review checkpoint during which the relevant parties meet to review the deployment of the training experience and possible revisions.

12. The method of claim 11, wherein:

the shaping checkpoint results in development of an initial course framework;

the planning review checkpoint results in a list of concrete actions to implement and risks to manage while building the training experience;

the validation checkpoint results in a determination of whether the training experience is or is not on track and a determination of any changes that need to be made to result in the training experience being on track; and the delivery review checkpoint results in qualitative data to explain course ratings and a plan for maintenance actions.

13. The method of claim 11, wherein planning the training experience comprises performing a first planning subphase in which an initial plan is developed and performing a second planning subphase in which the plan is further refined.

14. The method of claim 1, wherein the participant interaction comprises one of a text chat that includes the moderator in a text chat room, a question and answer session facilitated by the moderator, an interactive yes/no question and answer session, or an interactive survey question and answer session.

15. The method of claim 1, wherein analyzing the known information for the participants comprises:

determining that the participants in the training experience are new to an organization sponsoring the training experience; and determining an appropriate level of importance for the enculturation experience aspect in relation to the computer-based learning experience aspect, the networking experience aspect and the guest experience aspect in order to determine the appropriate balance for the training experience.

16. The method of claim 1, wherein analyzing the known information for the participants comprises:

determining the participants in the training experience are managers; and determining an appropriate level of importance for the networking experience aspect in relation to the computer-based learning experience aspect, the enculturation experience aspect and the guest experience aspect in order to determine the appropriate balance for the training experience.

17. The method of claim 1, wherein analyzing the known information for the participants comprises:

determining the participants in the training experience are senior management; and determining an appropriate level of importance for the guest experience aspect in relation to the computer-based learning experience aspect, the enculturation experience aspect and the networking experience aspect in order to determine the appropriate balance for the training experience.

18. The method of claim 1, wherein analyzing the known information for the participants comprises:

determining the participants in the training experience are staff members; and determining an appropriate level of importance for the learning experience aspect in relation to the computer-based networking experience aspect, the enculturation experience aspect and the guest experience aspect in order to determine the appropriate balance for the training experience.

19. The method of claim 1, wherein the delivery cost for the training experience is the cost of a delivery venue for an instructional portion of the training experience.

20. The method of claim 19, wherein the instructional portion of the training experience is provided in one of a face-to-face classroom environment, a virtual classroom environment, or as computer-based training.

21. The method of claim 1, wherein teaching participants about the history of the organization sponsoring the training comprises the use of storytelling techniques.

22. A system comprising:
one or more computers configured to perform operations comprising:
determining a desired performance outcome for participants in a computer-based training experience, wherein in the desired performance outcome is an outcome resulting from the training experience, and wherein the desired performance outcome includes a decrease in an undesired activity or an increase in a desired activity, and wherein the desired performance outcome includes an allowed margin of error for the decrease or increase;
identifying known information regarding the participants in the training experience, wherein the known information includes demographics of the participants and preexisting knowledge and experience levels of the participants;
determining an appropriate set of enablers based on the desired performance outcome and the known information, wherein the appropriate set of enablers includes one or more learning assets or educational products that allow for the transfer of knowledge to a participant or that allow for a participant to learn a skill;
determining an appropriate investment level to make in the training experience given the desired performance outcome, the known information, and the appropriate set of enablers, wherein the appropriate investment level is in terms of a development cost and a delivery cost for the training experience;
developing a training experience according to the desired performance outcome, the known information, the appropriate set of enablers, and the appropriate investment level, wherein developing the training experience comprises:
developing a computer-based learning experience aspect of the training experience, wherein the computer-based learning experience aspect imparts knowledge on training experience participants through one or more computers, and wherein the developing includes determining what a participant needs to do in each content area of the training and how the content should be ordered, given the determined set of enablers;
developing a networking experience aspect of the training experience over a computer network, wherein the networking experience includes participant interaction with a facilitator serving as a moderator of the interaction that allows multiple training experience participants to interact simultaneously with one another and the moderator while participating in the same training experience;
developing a guest experience aspect of the training experience, wherein the guest experience aspect is designed to engage an interest and focus of participants by personalizing the training experience to show the value of the participant to an organization sponsoring the training;
developing an enculturation experience aspect of the training experience, wherein the enculturation experience teaches participants about the core values and code of business of the organization sponsoring the training and teaches participants about the history of the organization sponsoring the training;
analyzing the known information for the participants; and
determining an appropriate balance between the computer-based learning experience aspect, the networking experience aspect, the guest experience aspect, and the enculturation experience aspect of the training experience based on the analysis of the known information for the participants; and
deploying the training experience.

23. The system of claim 22, further configured to perform operations comprising:
testing the training experience by implementing a pilot training experience program;
revising the training experience based on the pilot training experience program; and
wherein deploying the training experience comprises deploying the revised training experience.

24. The system of claim 22, further configured to perform operations comprising, concurrently to deploying the training experience, evaluating the deployed training experience and revising the deployed training experience based on the evaluation.

25. The system of claim 22, further operable to perform operations comprising determining one or more delivery requirements for the training experience, wherein the training experience is further developed according to the one or more delivery requirements.

26. The system of claim 25, wherein the one or more delivery requirements include an expected number of sessions for the training, an expected period of time for the training, a desired penetration for the training, and whether the training is required.

27. The system of claim 22, wherein developing the training experience comprises:
specifying a shaping checkpoint during which relevant parties meet to discuss an initial assessment of the training experience needs;
specifying a planning review checkpoint during which the relevant parties meet to discuss a plan for the training experience;
specifying a validation checkpoint during which the relevant parties meet to review initial portions of the training experience as the experience is being developed; and
specifying a delivery review checkpoint during which the relevant parties meet to review the deployment of the training experience and possible revisions.

28. The system of claim 27, wherein:
the shaping checkpoint results in development of an initial course framework;
the planning review checkpoint results in a list of concrete actions to implement and risks to manage while building the training experience;
the validation checkpoint results in a determination of whether the training experience is or is not on track and a determination of any changes that need to be made to result in the training experience being on track; and
the delivery review checkpoint results in qualitative data to explain course ratings and a plan for maintenance actions.

29. The system of claim 27, wherein planning the training experience comprises performing a first planning subphase in which an initial plan is developed and performing a second planning subphase in which the plan is further refined.

30. A non-transitory computer readable medium storing a computer-based training program, the computer-based training program comprising instructions, that when executed by one or more computers, cause the computers to perform operations comprising:

determining a desired performance outcome for participants in a computer-based training experience, wherein in the desired performance outcome is an outcome resulting from the training experience, and wherein the desired performance outcome includes a decrease in an undesired activity or an increase in a desired activity, and wherein the desired performance outcome includes an allowed margin of error for the decrease or increase;

identifying known information regarding the participants in the training experience, wherein the known information includes demographics of the participants and pre-existing knowledge and experience levels of the participants;

determining an appropriate set of enablers based on the desired performance outcome and the known information, wherein the appropriate set of enablers includes one or more learning assets or educational products that allow for the transfer of knowledge to a participant or that allow for a participant to learn a skill;

determining an appropriate investment level to make in the training experience given the desired performance outcome, the known information, and the appropriate set of enablers, wherein the appropriate investment level is in terms of a development cost and a delivery cost for the training experience;

developing a training experience according to the desired performance outcome, the known information, the appropriate set of enablers, and the appropriate investment level, wherein developing the training experience comprises:

developing a computer-based learning experience aspect of the training experience, wherein the computer-based learning experience aspect imparts knowledge on training experience participants through one or more computers, and wherein the developing includes determining what a participant needs to do in each content area of the training and how the content should be ordered, given the determined set of enablers;

developing a networking experience aspect of the training experience over a computer network, wherein the networking experience includes participant interaction with a facilitator serving as a moderator of the interaction that allows multiple training experience participants to interact simultaneously with one another and the moderator while participating in the same training experience;

developing a guest experience aspect of the training experience, wherein the guest experience aspect is designed to engage an interest and focus of participants by personalizing the training experience to show the value of the participant to an organization sponsoring the training;

developing an enculturation experience aspect of the training experience, wherein the enculturation experience teaches participants about the core values and code of business of the organization sponsoring the training and teaches participants about the history of the organization sponsoring the training;

analyzing the known information for the participants; and determining an appropriate balance between the computer-based learning experience aspect, the networking experience aspect, the guest experience aspect, and the enculturation experience aspect of the training experience based on the analysis of the known information for the participants; and deploying the training experience.

\* \* \* \* \*

UNITED STATES PATENT AND TRADEMARK OFFICE
CERTIFICATE OF CORRECTION

PATENT NO. : 8,328,559 B2  
APPLICATION NO. : 11/024960  
DATED : December 11, 2012  
INVENTOR(S) : Sambucetti et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1095 days.

Signed and Sealed this  
Fourth Day of November, 2014

Michelle K. Lee  
*Deputy Director of the United States Patent and Trademark Office*